US008831281B2

(12) United States Patent
Shellshear

(10) Patent No.: US 8,831,281 B2
(45) Date of Patent: Sep. 9, 2014

(54) SUMMARY VIEW OF VIDEO OBJECTS SHARING COMMON ATTRIBUTES

(75) Inventor: Andrew John Shellshear, North Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 56 days.

(21) Appl. No.: 13/326,098

(22) Filed: Dec. 14, 2011

(65) Prior Publication Data

US 2012/0163657 A1 Jun. 28, 2012

(30) Foreign Application Priority Data

Dec. 24, 2010 (AU) ................................. 2010257454

(51) Int. Cl.
*G06K 9/00* (2006.01)
*G06T 7/20* (2006.01)
(52) U.S. Cl.
CPC .............. *G06K 9/00751* (2013.01); *G06T 7/20* (2013.01); *G06T 2207/30241* (2013.01)
USPC ....................................................... 382/103
(58) Field of Classification Search
None
See application file for complete search history.

(56) References Cited

U.S. PATENT DOCUMENTS

| | | | |
|---|---|---|---|
| 6,678,413 B1 * | 1/2004 | Liang et al. ................... | 382/181 |
| 8,102,406 B2 * | 1/2012 | Peleg et al. .................... | 345/629 |
| 8,136,944 B2 * | 3/2012 | De Lemos ..................... | 351/209 |
| 8,325,982 B1 * | 12/2012 | Moon et al. .................... | 382/103 |
| 2003/0185434 A1 * | 10/2003 | Lee et al. ....................... | 382/154 |
| 2006/0078047 A1 | 4/2006 | Shu et al. | |
| 2006/0104479 A1 * | 5/2006 | Bonch-Osmolovskiy et al. ............................. | 382/103 |
| 2006/0117356 A1 * | 6/2006 | Jojic et al. ........................ | 725/88 |
| 2007/0121999 A1 * | 5/2007 | Ma et al. ........................ | 382/103 |
| 2008/0219509 A1 * | 9/2008 | White et al. ................... | 382/107 |
| 2010/0104266 A1 * | 4/2010 | Yashiro et al. ................ | 386/122 |
| 2011/0052003 A1 * | 3/2011 | Cobb et al. ..................... | 382/103 |
| 2011/0090344 A1 * | 4/2011 | Gefen et al. ................... | 348/169 |
| 2011/0228094 A1 * | 9/2011 | Cheng et al. ................... | 348/159 |
| 2011/0231419 A1 * | 9/2011 | Papke et al. .................... | 707/756 |
| 2012/0008819 A1 * | 1/2012 | Ding et al. ..................... | 382/100 |
| 2012/0008836 A1 * | 1/2012 | Bobbitt et al. ................ | 382/113 |
| 2012/0075450 A1 * | 3/2012 | Ding et al. ....................... | 348/77 |

FOREIGN PATENT DOCUMENTS

| | | |
|---|---|---|
| CN | 1556506 A | 12/2004 |
| WO | WO2012/020856 A1 * 8/2012 | ................ G06T 7/20 |

OTHER PUBLICATIONS

Senior et al. "Video Analytics for Retail" 2007.*
Romero et al. "Viz-a-Vis: Toward Visualizing Video through Computer Vision" 2008.*
Romero et al. "Viz-A-Vis: Toward Visualizing Video through Computer Vision," 2008.*

* cited by examiner

*Primary Examiner* — Vu Le
*Assistant Examiner* — Alexander J Lesnick
(74) *Attorney, Agent, or Firm* — Canon U.S.A., Inc. IP Division

(57) ABSTRACT

Disclosed herein are a method, system, and computer program product for displaying on a display device (214, 410) a track summary (411, 412) of an object in a scene of a video sequence. The method includes the steps of: determining a plurality of detected track elements of the object in the scene of the video sequence; receiving a selection criterion; identifying at least one characteristic of interest of the object, based on the selection criterion; selecting a track element from the plurality of detected track elements, said selected track element corresponding to the at least one identified characteristic of interest; determining a parameter of the selected track elements depending on the at least one characteristic of interest; and displaying the track summary derived from said detected track elements, based on the determined parameter.

12 Claims, 14 Drawing Sheets

SUMMARY VIEW OF VIDEO OBJECTS SHARING COMMON ATTRIBUTES

REFERENCE TO RELATED PATENT APPLICATION(S)

This application claims the benefit under 35 U.S.C. §119 of the filing date of Australian Patent Application No. 2010257454, filed Dec. 24, 2010, hereby incorporated by reference in its entirety as if fully set forth herein.

TECHNICAL FIELD

The present disclosure relates to the field of video analytics and, in particular, to summary visualisations of video foreground objects over a period of time.

BACKGROUND

Retail analytics is the study of how customers behave in shops. Understanding where people look, move, and what they buy can help shop owners advertise more effectively and improve their shop layouts. Traditionally, retail analytics is performed manually by using surveys, focus groups, analysts, and transaction histories. More recently, video surveillance cameras have been used to automate some of these tasks.

Object detection and tracking can be used to determine the number of people in a shop, and where they move within the shop. Events can be detected and flagged, including the detection of people running, going the wrong way through a one-way gate, going into a closed-off or restricted area, loitering, or abandoning or removing objects. Object recognition can be used to detect the presence and identity of objects, such as people, cars, etc. Object recognition can also be used to detect features of people, such as their age, sex, and where they are looking. Behaviour recognition can be used further to detect events such as fights, falls, and sitting or lying down.

Combining the information extracted from retail analytics into a summary can be difficult, however. A user will typically wish to summarise all the activity that has occurred in an area of interest over the course of a predetermined time period, such as a day or a week.

Some systems allow the user to see timelines with events marked on the timelines. This is somewhat useful for determining changing levels of activity during the day, but is much less useful for determining the locations or types of activity in the scene of interest.

Some systems allow playback of video captured from surveillance cameras in fast-motion playback, sometimes in combination with timelines and events. While the user can see the activity, the review process for the captured video is time consuming, and the user can miss details of the activities, as fast playback only provides a rough indication of the locations in which activity occurs. This review process also requires a machine that is capable of replaying the data captured or recorded by the video surveillance cameras.

Some systems improve video playback by automatically condensing sections of a video sequence. This is usually performed by identifying portions or sections of the video with different characteristics or properties and playing those sections at different speeds. The sections may include, for example, sections that contain no objects, sections that contain only objects that are stationary and not causing events, sections that contain objects that are moving but not causing events, and sections that are causing events. These systems further help the user to see activity, but only give a rough indication of locations within the scene in which activity occurs.

Some systems detect objects within a scene of interest and display a line traced through the centroids of the detected objects over a period of time, with the line superimposed over the current video frame. These systems improve the ability to determine locations of activity. However, for the purposes of providing a summary of activity, these systems do not give a good indication of traffic levels. The superimposition of object trails can sometimes give a misleading indication of the traffic levels. In addition, the traced lines do not show the original objects that contributed to those traced lines. These systems do not show the points on the scene that were touched by the objects detected in the scene, or indicate the object sizes, or show places in the scene where detected objects were stationary.

Some systems create average object detection maps over a time period and display the object detection maps as heat maps or opaque overlays on the scene. These systems have limitations that depend on the object detection technology. Systems that rely on motion detection do not accurately show areas where people are stationary. Systems that perform object detection combined with naïve average object detection maps are dominated by areas where people are stationary ("burn in"), unless tracking is used to associate objects over time and compensate for stationary periods. Furthermore, these systems are inflexible. Each object detection is given equal weight. If many objects have passed through a scene then some interesting trails may be hidden by the large number of other, overlapping trails.

Thus, a need exists to provide an improved method and system for providing a summary of activity in a scene of interest.

SUMMARY

It is an object of the present disclosure to overcome substantially, or at least ameliorate, one or more disadvantages of existing arrangements.

According to a first aspect of the present disclosure, there is provided a computer-implemented method of displaying on a display device a track summary of an object in a scene of a video sequence. The method determines a plurality of detected track elements of the object in the scene of the video sequence and receives at least one selection criterion that is used to produce the track summary containing information of interest to the user. The method identifies at least one characteristic of interest of the object, based on the selection criterion and selects a track element from the plurality of detected track elements, wherein the selected track element corresponds to the at least one identified characteristic of interest. The method determines a parameter of the selected track elements depending on the at least one characteristic of interest and displays the track summary derived from the detected track elements, based on the determined parameter.

According to a second aspect of the present disclosure, there is provided a computer readable storage medium having recorded thereon a computer program for displaying on a display device a track summary of an object in a scene of a video sequence. The computer program comprising code for performing the steps of: determining a plurality of detected track elements of the object in the scene of the video sequence; receiving a selection criterion; identifying at least one characteristic of interest of the object, based on the selection criterion; selecting a track element from the plurality of detected track elements, the selected track element corresponding to the at least one identified characteristic of interest; determining a parameter of the selected track elements depending on the at least one characteristic of interest; and displaying the track summary derived from the detected track elements, based on the determined parameter.

According to a third aspect of the present disclosure, there is provided an apparatus for displaying on a display device a track summary of an object in a scene of a video sequence. The apparatus includes a storage device for storing a computer program and a processor for executing the program. The program comprises code for performing the method steps of: determining a plurality of detected track elements of the object in the scene of the video sequence; receiving a selection criterion; identifying at least one characteristic of interest of the object, based on the selection criterion; selecting a track element from the plurality of detected track elements, the selected track element corresponding to the at least one identified characteristic of interest; determining a parameter of the selected track elements depending on the at least one characteristic of interest; and displaying the track summary derived from the detected track elements, based on the determined parameter.

In a further aspect, also disclosed is a computer-implemented method of displaying on a display device a track summary of an object in a scene of a video sequence. This method receives a selection criterion and selects a track summary of the object based on the received selection criterion. At least one characteristic of interest of the object is identified based on the selection criterion. The method selects at least one track element from the plurality of detected track elements, where the selected track elements correspond to the at least one identified characteristic of interest. A parameter of the selected track elements to be displayed is determined depending on at least one characteristic of interest, and the track summary derived from said selected track elements having the determined parameter is then displayed. Desirably the selection criterion is a region in the scene of the video sequence designated by a user. Advantageously the selecting step selects a track summary of the object that overlaps with the designated region, said overlap satisfying a predefined criterion.

In a further aspect, disclosed is a computer-implemented method of displaying on a display device a track summary of an object in a scene of a video sequence. This method identifies at least one characteristic of interest of the object, and selects at least one track element from the plurality of detected track elements associated with the object, where the selected track elements correspond to the at least one identified characteristic of interest. The method then displays on a display device the track summary comprising the selected track elements having a parameter, where the parameter of the selected track elements depending on the at least one characteristic of interest. Again the selection criterion is a region in the scene of the video sequence designated by a user. Also selecting step selects a track summary of the object that overlaps with the designated region, the overlap satisfying a predefined criterion.

According to another aspect of the present disclosure, there is provided an apparatus for implementing any one of the aforementioned methods.

According to another aspect of the present disclosure, there is provided a computer program product including a computer readable medium having recorded thereon a computer program for implementing any one of the methods described above.

Other aspects of the invention are also disclosed.

BRIEF DESCRIPTION OF THE DRAWINGS

One or more embodiments of the present disclosure will now be described with reference to the following drawings, in which.

DETAILED DESCRIPTION INCLUDING BEST MODE

Figure 1:
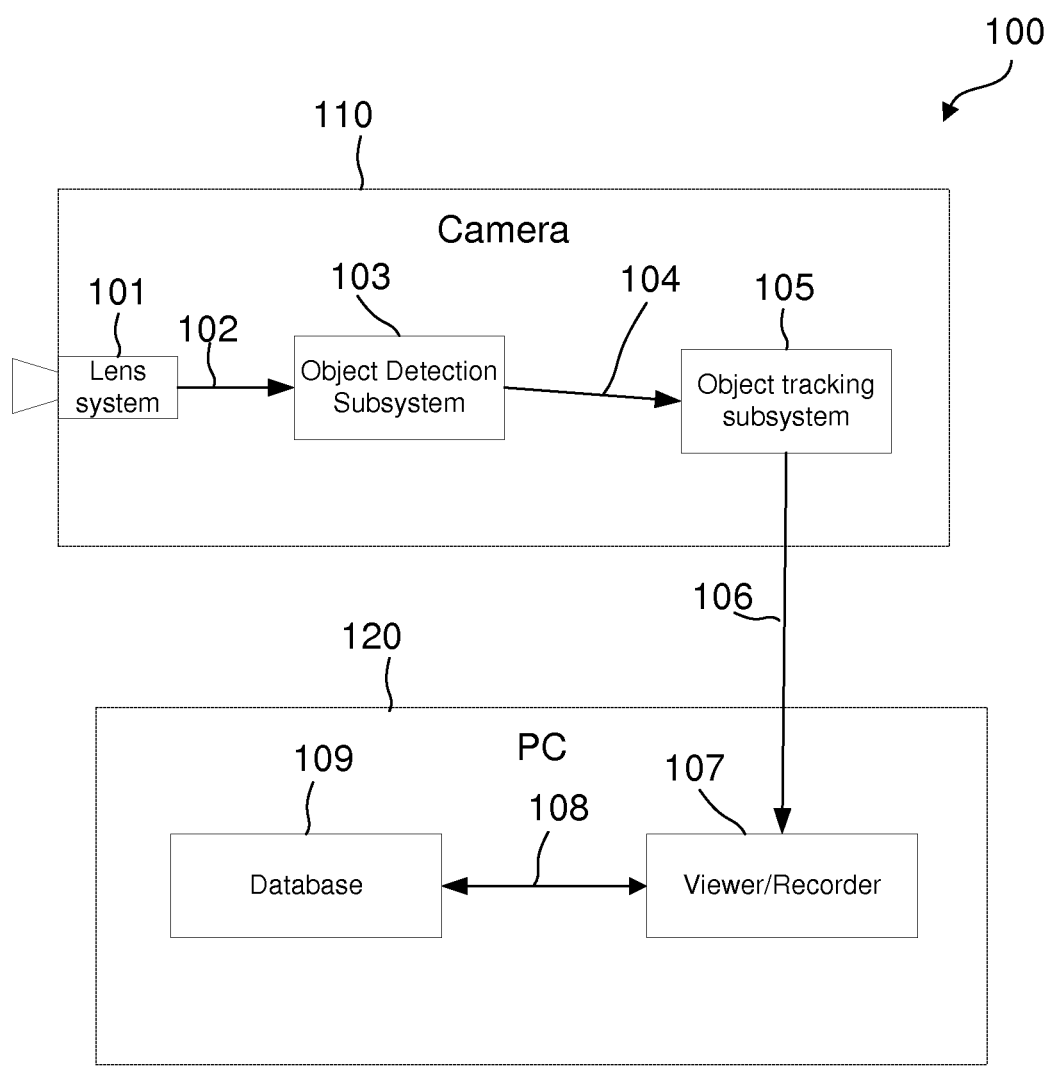
FIG. 1 shows a block flow diagram illustrating functionality of a system for recording and viewing video objects and tracks.

Where reference is made in any one or more of the accompanying drawings to steps and/or features that have the same reference numerals, those steps and/or features have for the purposes of this description the same function(s) or operation(s), unless the contrary intention appears.

The present disclosure relates to displaying a summary of activity over a predefined time period for a scene captured on a video. In one embodiment, the summary of activity is displayed using object trails, dependent upon input filtering criteria provided by an application or a user. In one embodiment, different levels of opacity are utilised to present different levels of activity performed by objects detected in the video over time.

A video is a sequence of images or frames. The terms 'frame' and 'image' are used interchangeably throughout this specification to describe a single image in an image sequence. Each image (frame) of the video has an x axis and a y axis. An image is made up of visual elements. The visual elements may be, for example, pixels, or 8×8 DCT (Discrete Cosine Transform) blocks as used in JPEG images in a motion-JPEG stream, or wavelet transforms. A block is a visual sub-element of a frame corresponding to a single co-ordinate of a (x-resolution, y-resolution) bitmask.

A video may be encoded and compressed. Such encoding and compression may be performed intra-frame, such as motion-JPEG (M-JPEG), or inter-frame, such as specified in the H.264 standard.

An image sequence depicts a scene, and includes one or more successive frames. A scene is the information contained in a frame and may include, for example, foreground objects, background objects, or a combination thereof, wherein an object is any entity that appears in the scene. In other words, a scene is a location observed or under surveillance by a camera and includes non-transient background, such as, for example, a couch. The scene may include transient foreground objects, such as, for example, a dancing child. The camera has a field of view. If the camera does not move, the field of view is fixed. A region is a user-defined, arbitrarily shaped area or areas of the scene. A region does not need to be contiguous; that is, a region may be defined to include a plurality of non-contiguous areas of a scene. A subregion is a user-defined contiguous arbitrarily shaped area of the scene.

A blob is a detection in a frame, by an object detection subsystem, of an object, part of an object, or several objects. The blob includes a bitmask with (x-resolution, y-resolution) and metadata. A track element is a detection of an object in a frame. The track element may include one or more blobs, in the form of a bitmask with (x-resolution, y-resolution), and metadata associated with each blob. A track is a collection of track elements associated with an object across multiple frames in a video sequence. The video sequence may be derived from one or more video cameras. The video sequence may include a plurality of successive frames captured by one or more video cameras over a period of time. The plurality of successive frames may be consecutive frames captured at a predetermined frame rate. Alternatively, the plurality of successive frames may non-consecutive frames sampled at a predetermined rate from a sequence of images captured by a video camera.

A scene model, or background model, is stored information relating to a background. A scene model generally relates to background information derived from one or more frames of an image sequence.

The purpose of performing foreground/background separation on a frame is to identify those parts in the frame that correspond to a foreground object and those parts in the frame that correspond to background. Foreground/background separation is useful for surveillance purposes, including the detection of unauthorised persons in restricted areas and the abandonment of parcels or other objects. Further, foreground/background separation is useful for video editing, and can be used to isolate one or more detected foreground objects. Once a foreground object has been isolated, the object can be enhanced, modified, edited, etc.

Disclosed herein are a computer-implemented method, system, and computer program product for displaying on a display device a track summary of an object detected in a scene captured in a video sequence. In one embodiment, the track summary displays all the track elements that satisfy a selection criteria. In another embodiment, the track summary displays the bitmasks of the track elements, and emphasises or enhances those bitmasks of the track elements that satisfy the selection criteria. In a further embodiment, the track summary displays all of the bitmasks of the track elements, and emphasises or enhances the bitmasks of the track elements dependent upon how well parameters of the track elements satisfy the selection criteria.

In one embodiment, the track summary is a weighted superimposition of partially opaque bitmasks of the track elements that have been detected in the scene during a specified period of interest. In one embodiment, each track element is weighted the same and the method performs a union of bitmasks associated with the track elements to produce the track summary. In one implementation, the union is performed by applying a "logical AND" operator. In a further embodiment, each track element is associated with a weighted level of opacity, wherein the different levels of opacity are utilised to identify is visually how well each track element matches a set of selection criteria. In an alternative embodiment, the track summary is a heat map of the track elements that have been detected in the scene during a specified period of interest.

The method detects one or more track elements associated with the object in the scene and displays the bitmasks of the plurality of detected track elements in the scene as the track summary. The method determines at least one characteristic of interest of the object based on user input and selects a track element of the plurality of detected track elements corresponding to the determined characteristics. In one embodiment, the characteristic of interest relates to the apparent size of the object from the perspective view of a display device on which the track summary is to be displayed. The method determines a parameter of the selected track elements depending on the characteristics of interest and changes the displayed track elements in the scene based on the determined parameter.

One embodiment of the present disclosure provides a computer-implemented method of displaying on a display device a track summary of an object in a scene of a video sequence. The method determines a plurality of detected track elements associated with the object in the scene of the video sequence and receives at least one selection criterion, wherein the at least one selection criterion is used to produce a track summary containing information of interest to the user. The method utilises the selection criterion to identify at least one characteristic of interest of the object and selects a track element from the plurality of detected track elements, wherein the selected track element corresponds to the at least one identified characteristic of interest. The method determines a parameter of the selected track elements depending on the at least one characteristic of interest and displays the track summary derived from the detected track elements, based on the determined parameter.

In an embodiment of the present disclosure, a video camera captures video of a scene over a time period, and objects are detected and tracked over that period. A scene summary is created by combining a number of track summaries over that period. FIG. 1 is a schematic block diagram representation of a system 100 for recording and viewing video objects and tracks. The system 100 includes a camera 110 coupled to a computer 120.

The camera 110 includes a lens system 101 coupled to an object detection system 103 and an object tracking subsystem 105. The lens system 101 receives light from a scene and records an image frame of the scene on a recording means, such as a sensor or film. The lens system 101 sends recorded video data of the scene, in the form of a sequence of one or more video frames, by a communication bus 102 to the object detection subsystem 103. The object detection subsystem 103 processes a received frame to detect blobs corresponding to objects in the frame and create a detection bitmap. This detection bitmap has a resolution of (x-resolution, y-resolution) and an associated metadata for each detected blob. The bitmap, blob metadata, and video data are sent from the object detection subsystem 103 via a connection 104 to the object tracking subsystem 105.

The object tracking subsystem 105 on the camera 110 associates blobs with an object to create a track element. The object tracking subsystem 105 then associates blobs linked to the same objects in different frames to create tracks. The video data, bitmap, blob metadata, track elements, and tracks are sent from the object tracking subsystem 105 via a communication link 106 to a viewer/recorder 107 on the computer 120. The computer 120 also includes a database 109. The communication link 106 may be a wired or wireless communication link and may include part of a communications network, including the Internet. Alternatively, the communication link 106 may be implemented using a dedicated transmission link. In a further alternative, the camera 110 and the computer 120 form an integrated device and the communication link 106 may be an internal bus connection.

The video data, bitmap, blob metadata, track elements and tracks 108 are received by the viewer/recorder 107 and are also sent to the database 109, which stores the video data, bitmap, blob metadata, track elements and tracks 108. The viewer/recorder 107 is coupled to the database 109 and is adapted to search for and retrieve video data, bitmaps, blob metadata, track elements and tracks 108 from the database 109.

Figure 2A:
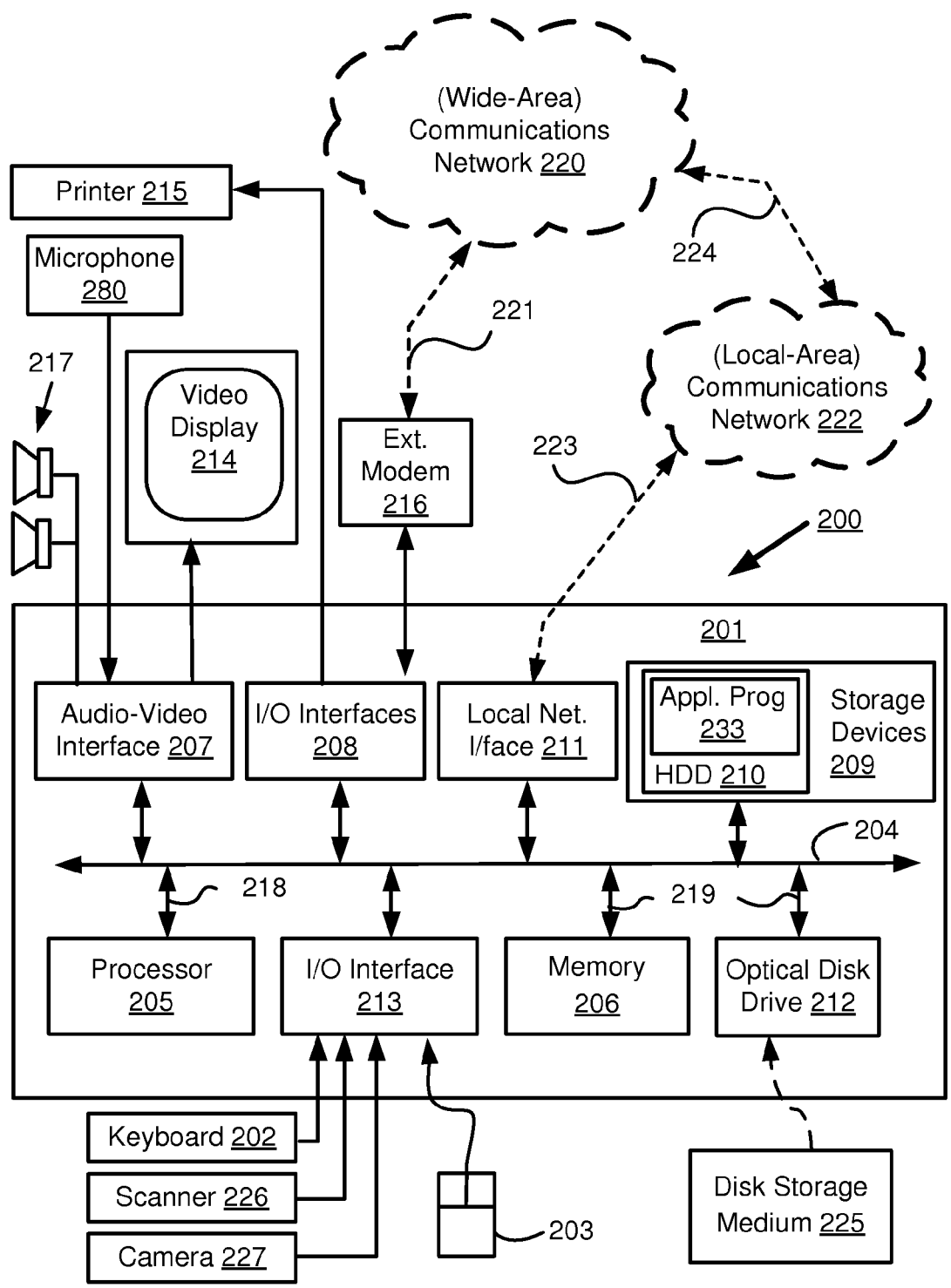
FIGS. 2A and 2B form a schematic block diagram of a general purpose computer system upon which arrangements described can be practised.
Figure 2B:
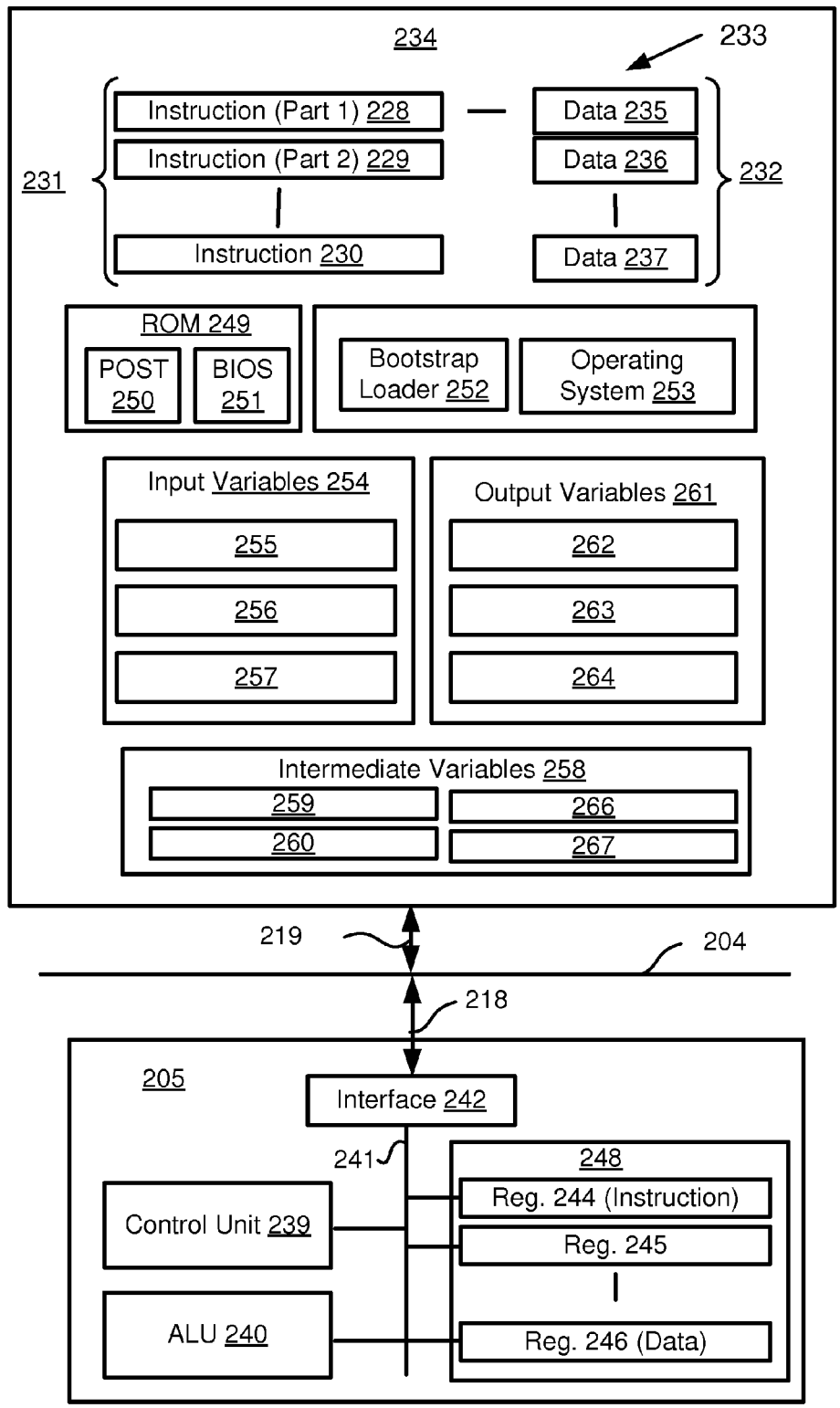

FIGS. 2A and 2B depict a general-purpose computer system 200, exemplary of the computer 120, upon which the various arrangements described can be practised.

As seen in FIG. 2A, the computer system 200 (120) includes: a computer module 201; input devices such as a keyboard 202, a mouse pointer device 203, a scanner 226, a camera 227, and a microphone 280; and output devices including a printer 215, a display device 214 and loudspeakers 217. An external Modulator-Demodulator (Modem) transceiver device 216 may be used by the computer module 201 for communicating to and from a communications network 220 via a connection 221. The communications network 220 may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet™ circuit card, a Bluetooth™ wireless arrangement, or an IEEE 802.11 wireless arrangement; however, numerous other types of interfaces may be practised for the interface 211.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PCs and compatibles, Sun Sparcstations, Apple Mac™, or like computer systems.

The method of displaying a track summary of an object in a scene may be implemented using the computer system 200, wherein the processes of FIGS. 1, and 3 to 12, to be described, may be implemented as one or more software application programs 233 executable within the computer system 200. In particular, the steps of the method of displaying a track summary are effected by instructions 231 (see FIG. 2B) in the software 233 that are carried out within the computer system 200 (120). This software 233 may include the viewer/recorder 107 on the computer system 120. The software instructions 231 may be formed as one or more code modules, each for performing one or more particular tasks. The software may also be divided into two separate parts, in which a first part and the corresponding code modules performs the displaying, receiving selection criteria, selecting of track elements, determining of parameters, and displaying methods and a second part and the corresponding code modules manage a user interface between the first part and the user.

The software 233, embodying the viewer/recorder 107, is typically stored in or on the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212. A computer readable medium having such software or computer program recorded on it is a computer program product. The use of the computer program product in the computer system 200 preferably effects an apparatus for video surveillance and retail analytics.

In some instances, the application programs 233 for viewing and recording the video sequence may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of software, application programs, instructions and/or data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically include a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternatively, an instruction may be segmented into a number of parts each of which is stored in a separate memory location, as depicted by the instruction segments shown in the memory locations 228 and 229.

In general, the processor 205 is given a set of instructions which are executed therein. The processor 1105 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. In this case, the viewer/recorder 107 as executed by the processor 205 receives video data, bitmaps, blob metadata, track elements and tracks 108 from the database 109 stored in one of the memory devices 206, 209 or 225. The execution of a set of the instructions may in some cases result in output of data. Execution may also involve storing data or variables to the memory 234.

The disclosed track summary display arrangements use input variables 254, which are stored in the memory 234 in corresponding memory locations 255, 256, 257. The track summary display arrangements produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

(a) a fetch operation, which fetches or reads an instruction 231 from a memory location 228, 229, 230;

(b) a decode operation in which the control unit 239 determines which instruction has been fetched; and (c) an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the processes of FIGS. 1, and 3 to 12 is associated with one or more segments of the program 233 and is performed by the register section 244, 245, 247, the ALU 240, and the control unit 239 in the processor 205 working together to perform the fetch, decode, and execute cycles for every instruction in the instruction set for the noted segments of the program 233.

The method of displaying a track summary of an object detected in a scene may alternatively be implemented in dedicated hardware such as one or more integrated circuits performing the functions or sub functions of displaying track elements, receiving selection criteria, determining properties of selected track elements, and changing the displayed track elements. Such dedicated hardware may include graphic processors, digital signal processors, or one or more microprocessors and associated memories.

Figure 3A:
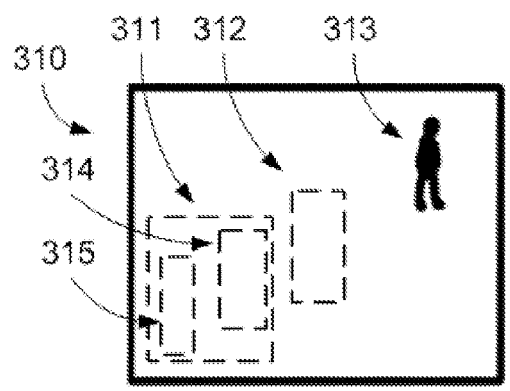
FIGS. 3A to 3H illustrate several techniques for displaying track summaries using an example scenario.

FIGS. 3A to 3H are schematic representations illustrating several techniques for displaying track summaries using an example scenario. FIG. 3A shows a view of a scene 310 from a video camera 110, with a person 313 in the scene detected by the object detection subsystem 103. In this example, the person 313 has walked across the field of view from left to right and heading away from the camera. In a first area 311 on the left of the scene 310, the person 313 performs an activity of interest to the viewer and then the person 313 stops and is stationary for a short period of time in a second area 312 in the middle of the scene 310. The activity of interest to the viewer may include, for example, the person 313 moving faster than a predefined motion threshold for a predefined period of time. Within the area 311, the degree of interesting activity is greatest in two further areas 314, 315. For example, the areas 314, 315 may correspond to the location in the scene 310 in which the person 313 is moving the fastest.

Figure 3B:
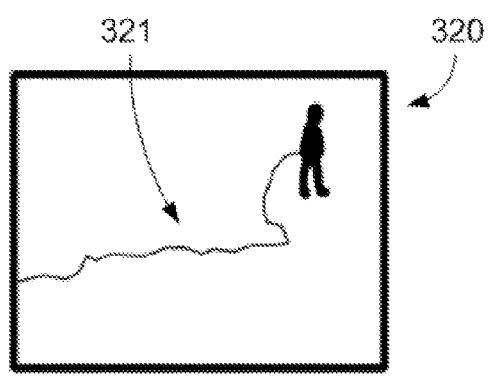

FIG. 3B shows a summary view 320 of the track of the person 313 through the scene 310. The summary view 320 shows a line 321 tracing the centroid of the track over a number of previous frames, as detected by the object tracking subsystem 105, thus giving an impression of where the person 313 had previously been in the scene. However, the summary view 320 does not give any indication of other aspects that may be of interest to the user, such as how fast the person 313 was moving at each point in the scene 310, or what objects the person 313 touched in the scene 310.

Figure 3C:
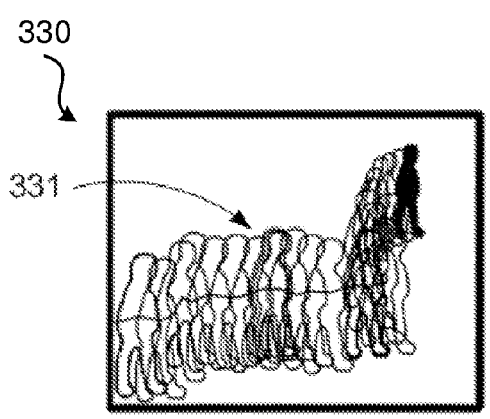

FIG. 3C shows an alternative summary view 330 of the track of the person 313 through the scene 310. The summary view 330 adds outlines of each track element 331 for each previous frame, thus producing a better impression of the areas of the scene 310 that had been touched, and a rough indication of the speed of the person 313. In the example of FIG. 3C, the outlines of the person 313 being closer together provide an indication that the person 313 was going slower over that area of the scene 310. Conversely, the outlines of the person 313 being further apart provide an indication that the person 313 was travelling faster over that area of the scene 310.

Figure 3D:
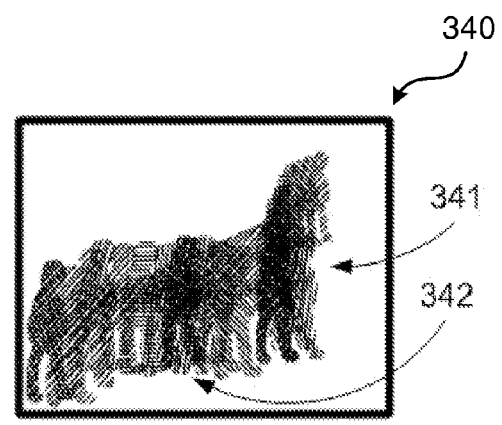

FIG. 3D shows another alternative summary view 340 of the track of the person 313 through the scene 310. The summary view 340 overlays partially opaque bitmasks of the track elements 341 instead of the outlines used in the summary view 330. The partially opaque bitmasks of the track elements 341 of the summary view 340 provide a stronger indication of where in the scene 310 the person 313 was traveling slowly, or stopping, as darker areas, such as when the person stopped in an area 342 in the middle of the scene 310. However, the summary view 340 also shows a dark area to the right of the scene 310, corresponding to where the person 313 was walking away from the camera. The summary view 340 does not distinguish between instances where someone is standing still and instances where someone is moving around but is "touching" the same screen pixels multiple times.

Figure 3E:
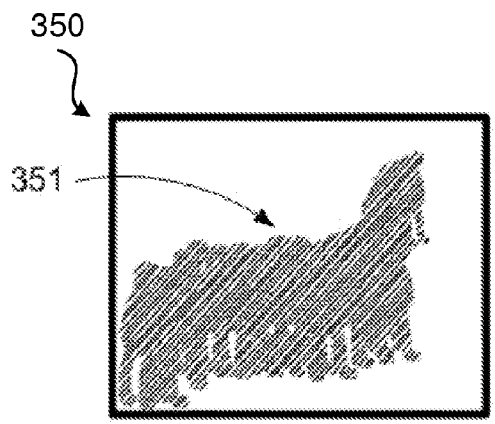

FIG. 3E shows another alternative summary view 350 of the track of the person 313 through the scene 310. The summary view 350 creates a track having a mask with a constant opacity for every point in the frame 351 that was touched by a track element. This summary view 350 may be used, for example, in scenarios where the user is not interested in properties of individual tracks. For example, the summary view 350 is useful when a user wants to identify an area in a scene in which there has been the most activity, discounting activity from the same source object. In such a scenario, it is preferable that a person standing still for half an hour in a scene should not cause the system to show that area as being as popular as if many different people passed through that area.

Figure 3F:
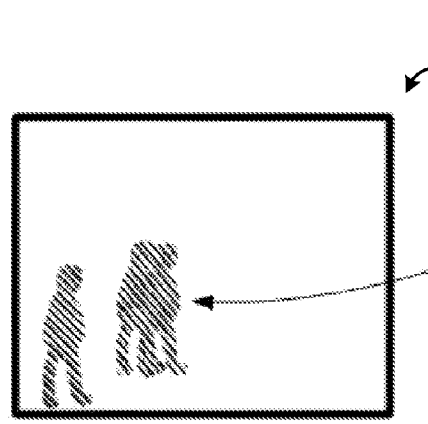

FIG. 3F shows another alternative summary view 360 of the track of the person 313 through the scene 310. The summary view 360 creates a track that shows only the track elements 361 that have an activity of interest corresponding to selection criteria specified by the user. The selection criteria may include, for example, one or more predefined activities of interest selected by the user or predefined for the system. The summary view 360 may be used in scenarios in which the user wishes to see only the areas of the scene in which the predefined activity of interest was occurring. A method for producing the summary view 360 is described later with reference to FIG. 6.

Figure 3G:
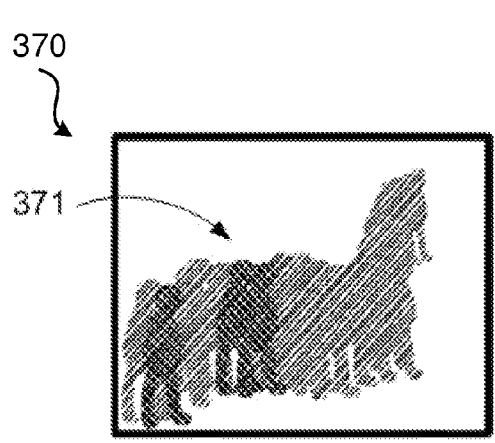

FIG. 3G shows a further alternative summary view 370 of the track of the person 313 through the scene 310. The summary view 370 creates a track that shows a combination of summary views 350 and 360. The summary view 370 utilises a mask that is created for every point 371 in the frame that was touched by a track element with the specified activity of interest, and further utilises a different opacity for every other point in the frame that was touched by a track element. This alternative summary view 370 may be used in scenarios in which the user wishes to see both the areas in the scene 310 in which people were performing an activity of interest and also the areas in the scene 310 in which people went, even when those people were not doing that activity of interest. A method for producing the summary view 370 is described later with reference to FIG. 6.

Figure 3H:
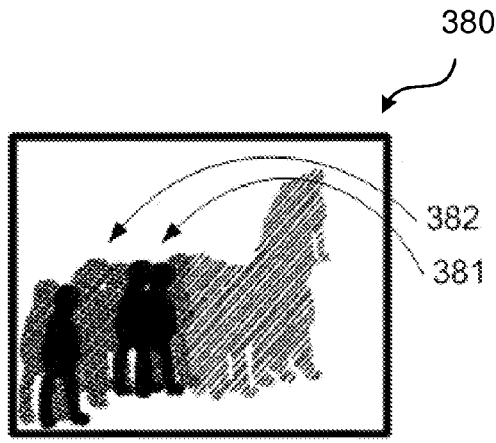

FIG. 3H shows yet another type of summary view 380 of the track of the person 313 through the scene 310. The summary view 380 creates a track that utilises a mask for which the opacity of each point on the frame is a function of how closely any track element touching that point matched the criteria specified by the user. In this case, the area 381 in which the activity level was greatest is emphasised the most, but the area 382 surrounding the area 381 is also emphasised. The summary view 380 may be used in scenarios in which the user wishes to see the degree to which people were performing the activity of interest in the scene 310. A method for producing this summary view is described later with reference to FIG. 6.

Other alternative summary views that use search criteria or selection criteria to emphasise or obscure the bitmasks of the track elements may equally be practised. For example, using the example scenario, a further summary view emphasises the area 312 in which the person 313 paused for a moment, by searching for track elements with high appearance age; that is, the amount of time that each pixel of the track element has had the same appearance. This would not show the area to the right of the scene 310, where the person 313 is walking away from the camera, because although the track elements overlap, the appearance of each pixel changes.

Figure 4:
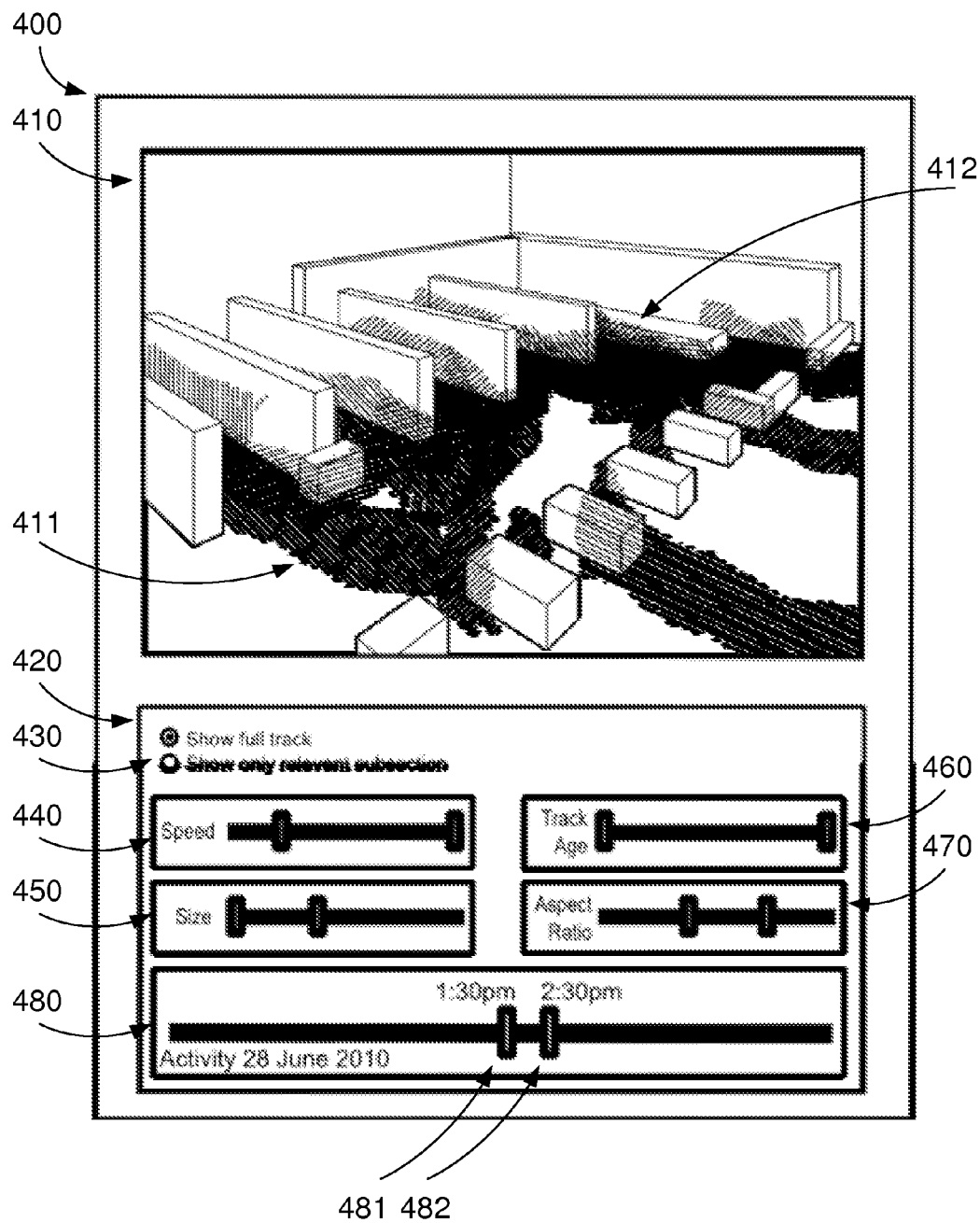
FIG. 4 shows a diagram illustrating a user interface according to an embodiment of the present disclosure.

FIG. 4 is a diagram illustrating a user interface 400 according to an embodiment of the present disclosure. The user interface 400 includes a view window 410 and a lower panel 420. The view window 410 shows a view of a scene captured by a video camera. In the example illustrated, the scene relates to a supermarket with a plurality of aisles and checkouts. The view window 410 displays a representative frame of a video sequence captured by a surveillance camera. Superimposed over this view in the view window 410 are semi-opaque track summaries 411, 412.

The lower panel 420 allows settings to be altered by a user to change what is shown in the view window 410. The lower panel 420 includes a pair of radio buttons 430 that can be set by the user to alternate between display of full tracks and display of only the relevant subsection of the tracks, according to the available search criteria or selection criteria. In the example shown in FIG. 4, the lower panel 420 enables a user to select criteria for speed 440, size 450, track age 460, aspect ratio 470, and time 480. Each search criterion 440, 450, 460, 470, 480 has a label, a horizontal bar, and a pair of sliders that can be manipulated by the user to set a minimum and a maximum value of each parameter. For example, the time 480 has sliders 481, 482 that are utilised to define a start time and a finish time for information that is to be displayed in the view window 410. It will be appreciated by a person skilled in the relevant art that other user interfaces may equally be practised without departing from the spirit and scope of the present disclosure. For example, alternative user interfaces may include dropdown menus or radio buttons corresponding to predefined quantities, amounts, or times.

In the example shown in FIG. 4, the lower panel 420 indicates that the user has already set the speed search criterion 440 to exclude tracks that only travel slowly, the size search criterion 450 to exclude tracks that consist only of large objects, the track age search criterion 460 not to exclude any track ages, the aspect ratio search criterion 470 to exclude tracks that consist only of extreme aspect ratios, and the time search criterion 480 to show tracks that existed between 1:30 pm 481 and 2:30 pm 482 on 28 Jun. 2010.

The view window 410 shows only track summaries for which, for each search criterion, there exists at least one track element that matches that search criterion. Such search criteria is defined as "track element search criteria" or "track element selection criteria", because the search criteria depend upon properties of individual track elements. A list of track element characteristics (properties) is provided later. An alternative implementation of the user interface lower panel 420 includes other track element search criteria from the list of track element properties. Other search criteria relate to the entirety of the track. Such search criteria are referred to as "track search criteria" or "track selection criteria". A list of track properties or track characteristics is provided later. Another alternative implementation of the user interface lower panel 420 includes track search criteria or track selection criteria from the list of track search criteria.

Figure 5:
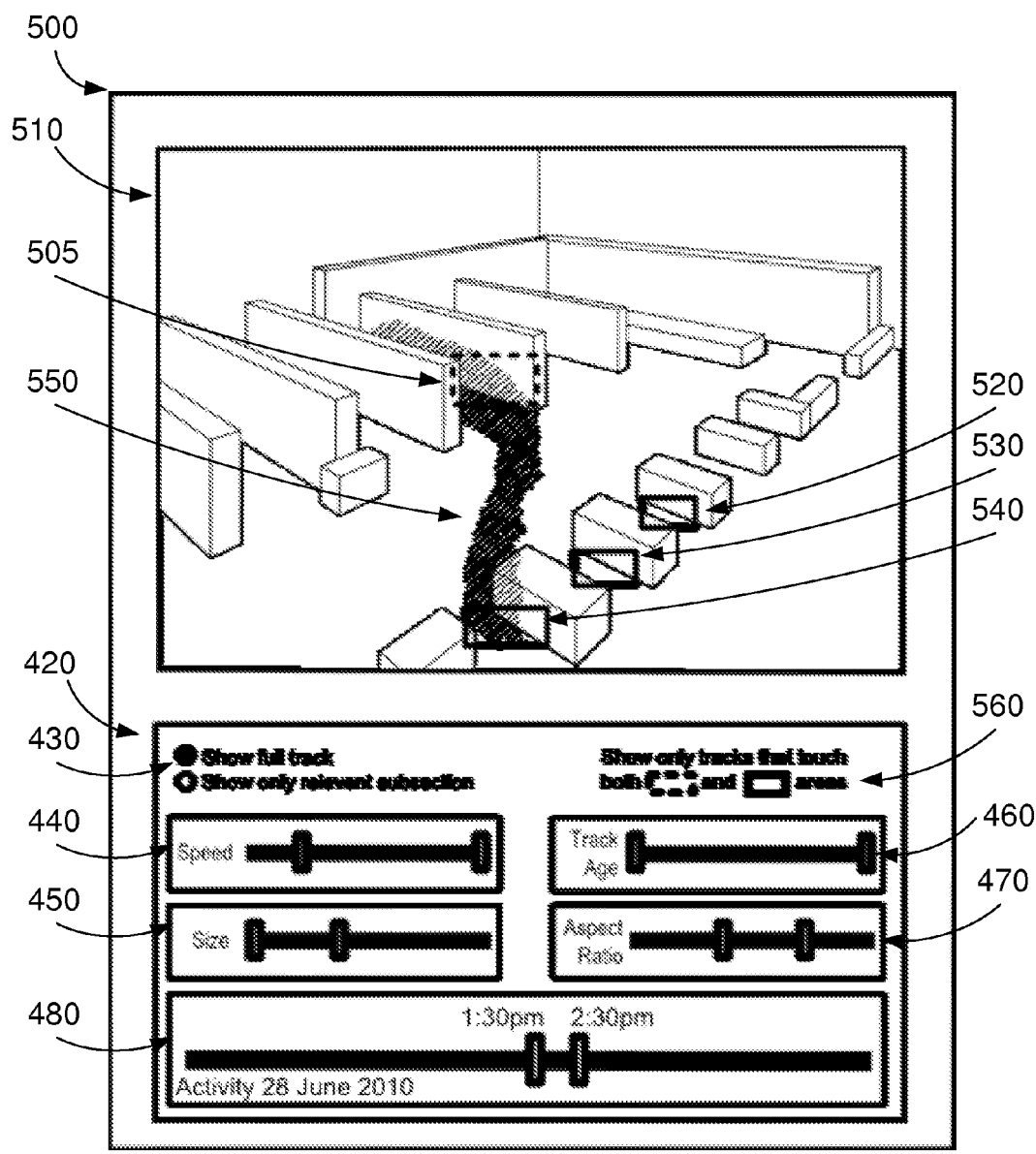
FIG. 5 shows a diagram illustrating a second user interface according to an embodiment of the present disclosure.

FIG. 5 is a diagram illustrating a second user interface 500 according to an embodiment of the present disclosure. The user interface 500 is a refinement of the user interface 400 of FIG. 4. The user interface 500 includes a view window 510 and a lower portion 520. The user interface 500 incorporates the addition of a user-defined first region 505 on the scene shown in the view window 510. The user-defined first region 505 is denoted with a dashed-line rectangle. The user interface 500 also includes a user-defined second region that includes three subregions 520, 530, 540 denoted with solid line rectangles. Depending on the application, any number of user-defined regions may be available.

In this example, the lower panel 520 includes search criterion to display tracks 550 in the view window 510 that touch both the first region 510 and the second region 520, 530, 540. The displayed tracks 550 must also satisfy any other user-defined criteria in the lower panel 520. In this example, the lower panel 520 includes selection criteria 440, 450, 460, 470, 480 as described with reference to FIG. 4.

There are multiple means by which the user may define the first region 505 and the second region 520, 530, 540 on the view window 510. In one implementation, the user creates a first region 505 by moving a cursor, using a mouse, within the view window and left-clicking the mouse button once to select one corner of the subregion rectangle, and left-clicking the mouse button a second time to select the diagonal opposite corner of the subregion rectangle. Further subregions may be created in this fashion, which also form part of the region. The user may further create a second region by holding down the "control" key on a keyboard while using the mouse to define a subregion. Other implementations utilise input from a stylus, keyboard, light pen, or other input means to define one or more regions or subregions. In an alternative embodiment, one or more regions are predefined and are available for activation by the user.

In another implementation, the user selects multiple points of a polygon to define each subregion. In another implementation, the user creates only one region, in which case the track need only touch any subregion of that region in order to be displayed, in addition to satisfying any other selection criteria. In another embodiment, the user creates more than two regions, in which case the track needs to touch at least one subregion of each region in order to be displayed, in addition to satisfying other selection criteria. In another implementation, colour is used to differentiate regions instead of stroke style. In another implementation, rather than simply require an overlap, a track is defined as touching a region only if the overlap between the region and track is greater than a specified size. The specified size may be described relative to a proportion of the size of the region, a proportion of the size of the track, or an absolute number of pixels. In another implementation, one or more "ignore" region types are specified, such that a track is shown only if it does not touch a subregion of each ignore region, in addition to satisfying other selection criteria.

Figure 6:
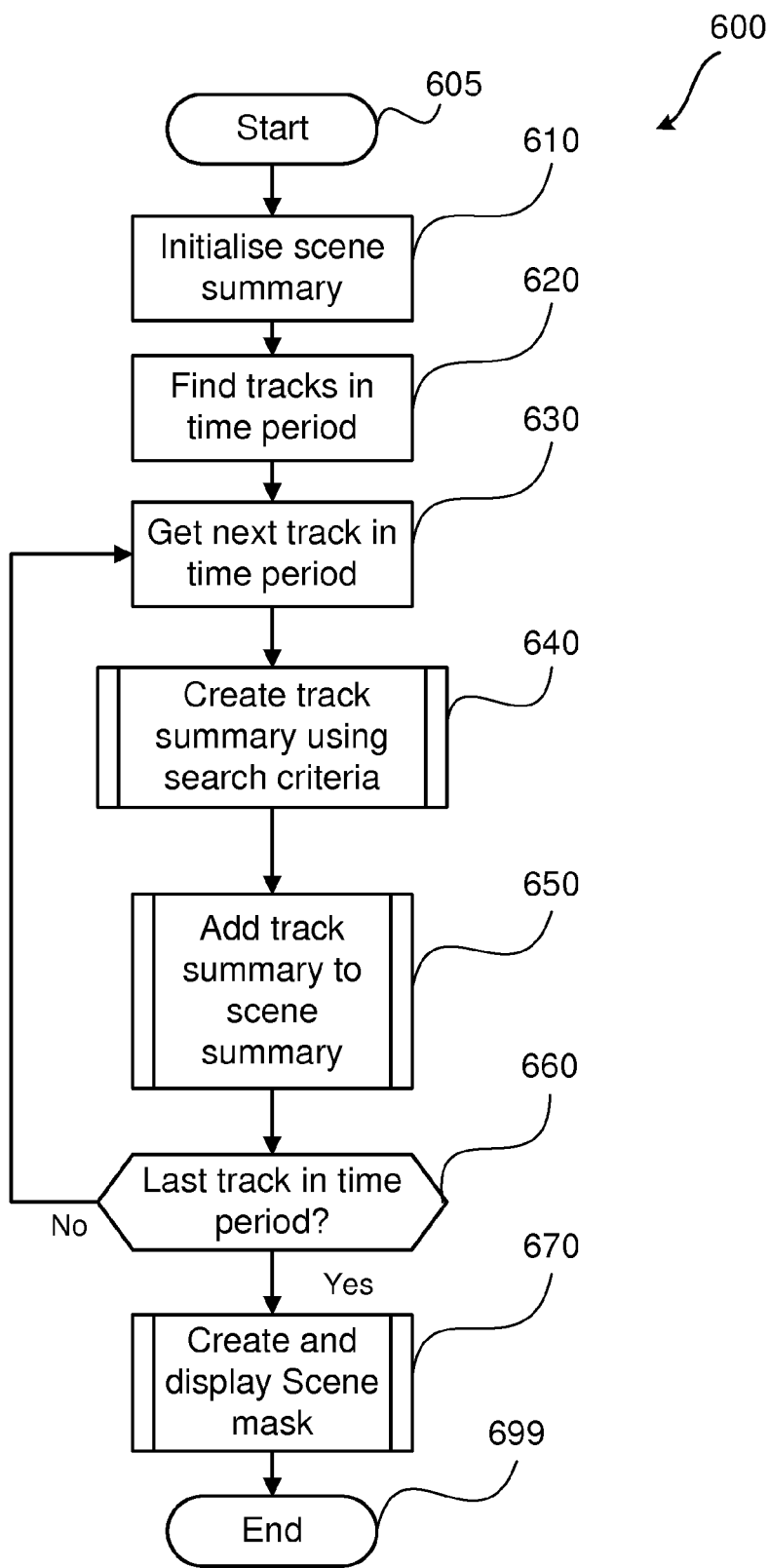
FIG. 6 shows a flow diagram of a video scene summary subsystem resident on a computer module according to an embodiment of the present disclosure.

FIG. 6 is a flow diagram 600 illustrating functionality of a video scene summary subsystem, which may be resident on a computer 120 or computer module 200, according to an embodiment of the present disclosure. The process 600 begins at a Start step 605 and proceeds to step 610 to initialise a scene summary. In one embodiment, the scene summary includes a two-dimensional array of integers, each corresponding to an (x,y) position of the frame, with (x-resolution, y-resolution) corresponding to the resolution of the object detection subsystem 103. The integers in the array are initialised to 0. The process then passes from step 610 to step 620, which locates tracks in the database 109 that overlap a time period previously specified by the user. For example, the user may specify the time period of interest using the user interface sliders 481, 482 described with reference to the user interface 400 of FIG. 4.

The process 600 then processes in turn each track found in the locating step 620, starting with the first track, and creates a track summary using user-specified selection criteria. Accordingly, control passes from step 620 to step 630, which retrieves a next track for processing. Control passes to step 640, which creates a track summary using the predefined criteria specified by the user. For example, the criteria may be input using the user interface 400 of FIG. 4 to select criteria for one or more of speed 440, size 450, track age 460, and aspect ratio 470. The process proceeds to step 650, which adds each track summary to the scene summary, and continues by checking at step 660 whether all the located tracks have been processed. If step 660 determines that the current track being processed is the last track within the predefined time period, Yes, then control passes to step 670. Step 670 creates and displays a scene mask and then control passes to an End step 699 and the process 600 terminates. If step 660 determines that the current track being processed is not the last track within the predefined time period, No, then control returns to step 530 to process another track.

Figure 7:
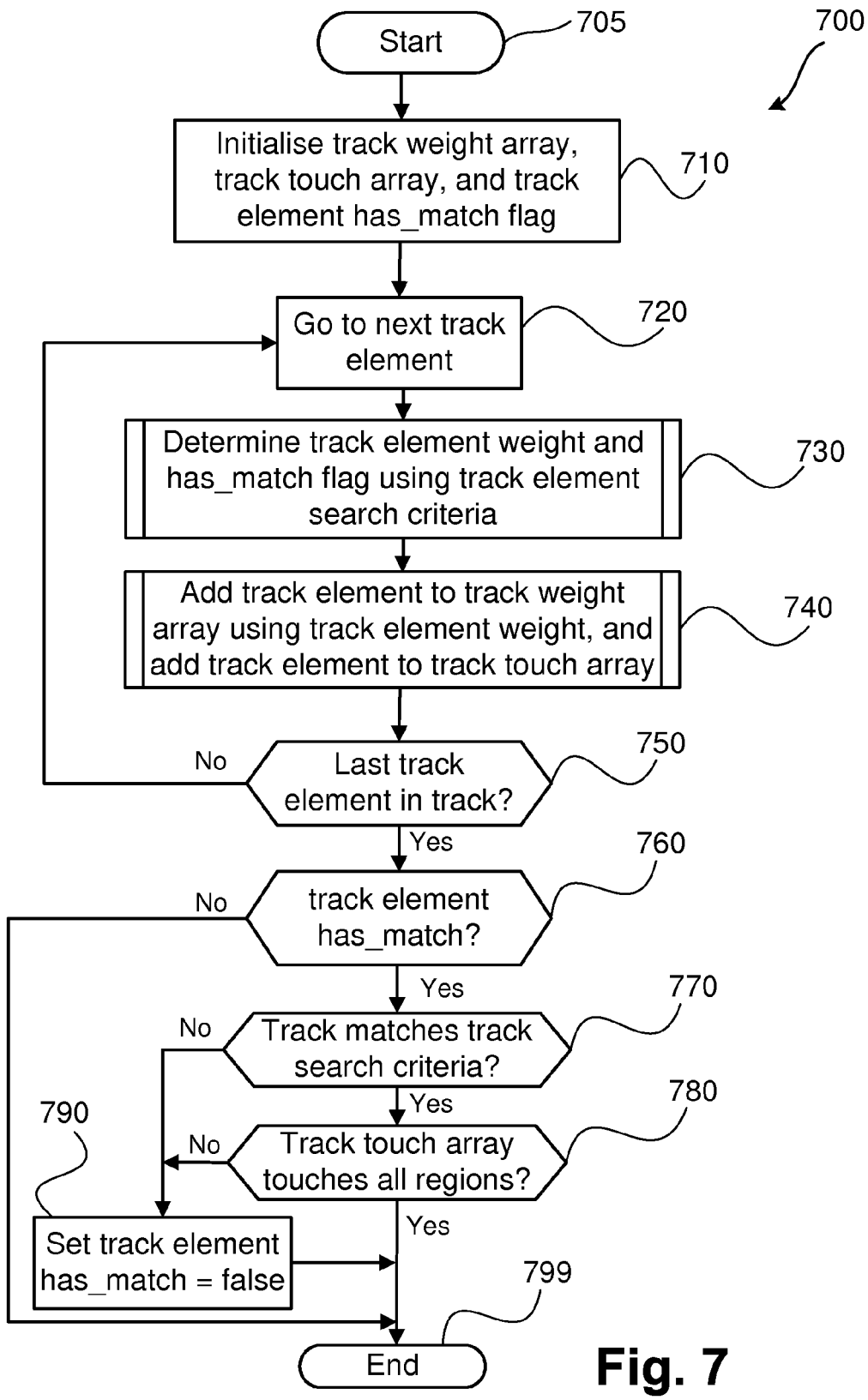
FIG. 7 shows a flow diagram of creating a track summary using a set of search criteria in the video scene summary subsystem resident on a computer module.

FIG. 7 is a flow diagram 700 illustrating functionality of a video scene summary subsystem on a computer 120 or computer module 200 corresponding to the step 640 of FIG. 6, by creating a track summary using search criteria or selection criteria. The process 700 begins at a Start step 705 and proceeds to step 710, which initialises a track weight array and a track touch array and sets a has_match flag to be false. In one embodiment, the track weight array includes a two-dimensional array of integers, each integer corresponding to an (x,y) position of the frame, with (x-resolution, y-resolution) corresponding to the resolution of the object detection subsystem 103. The integers of the track weight array are initialised to 0. The track touch array consists of a two-dimensional array of bits, each corresponding to an (x,y) position of the frame, with (x-resolution, y-resolution) corresponding to the resolution of the object detection subsystem 103. The bits of the track touch array are initialised to 0.

The process then loops through each track element of the track, by processing a next track element in step 720. Control passes from step 720 to step 730, which uses the track element search criteria to determine the track element bitmask weight and set the has_match flag, as described in further detail with reference to FIG. 8. The process then continues to step 740 by adding the track element to the track weight array using the track element bitmask weight and adding the track element to the track touch array 740, as described in further detail with reference to FIG. 9. The process then continues to step 750, which checks whether all the track elements have been processed. If at step 750 the current track element is not the last track element in the track, No, control loops to step 720 to process another track element. However, if at step 750 the current track element is the last track element in the track, Yes, then control passes from step 750 to step 760.

Step 760 checks whether the has_match flag associated with the track element is set to true. If the has_match flag is not set to true, No, control passes to an End step 799 and the process 700 terminates. Otherwise, if at step 760 the has_match flag associated with the track elements is set to true, Yes, the process continues to step 770, which checks whether properties of the track additionally match any user-defined track search criteria or selection criteria. If the track does not match the selection criteria, No, control passes to step 790, which resets the track element has_match flag to false, and then proceeds to the End step 799. Otherwise, if at step 770 the track matches the selection criteria, the process 700 continues to step 780, which checks whether the track touch array touches all the user-defined regions, as described in further detail with reference to FIG. 10. If the track touch array does not touch all the user-defined regions, No, the process continues to step 790 to reset the track element has_match flag to false, and then terminates at the End step 799. If at step 780 the track touch array does touch all the user-defined regions, Yes, the process terminates at the End step 799.

A track characteristic (property) is any characteristic (property) associated with a track as a whole and may include, but is not limited to: the length of time the track was in the scene; whether the track started or ended in a merge or a split; a calculated probability that the track has a characteristic (property) based on the percentage of track elements belonging to the track that had the characteristic (property) (see track element characteristics for a list of such characteristics); average aspect ratio of the track; calculated object size of the track; average speed of the track; and the percentage of the scene or a defined region or regions touched by the track. Minima and maxima for any track parameter may have been set by the user, for example, using a user interface element (e.g., 440 of FIG. 4). For each parameter set, the process compares each track parameter with the minimum and/or maximum value set by the user. The track is considered to match only if all track parameters are within the minima and maxima.

Figure 8:
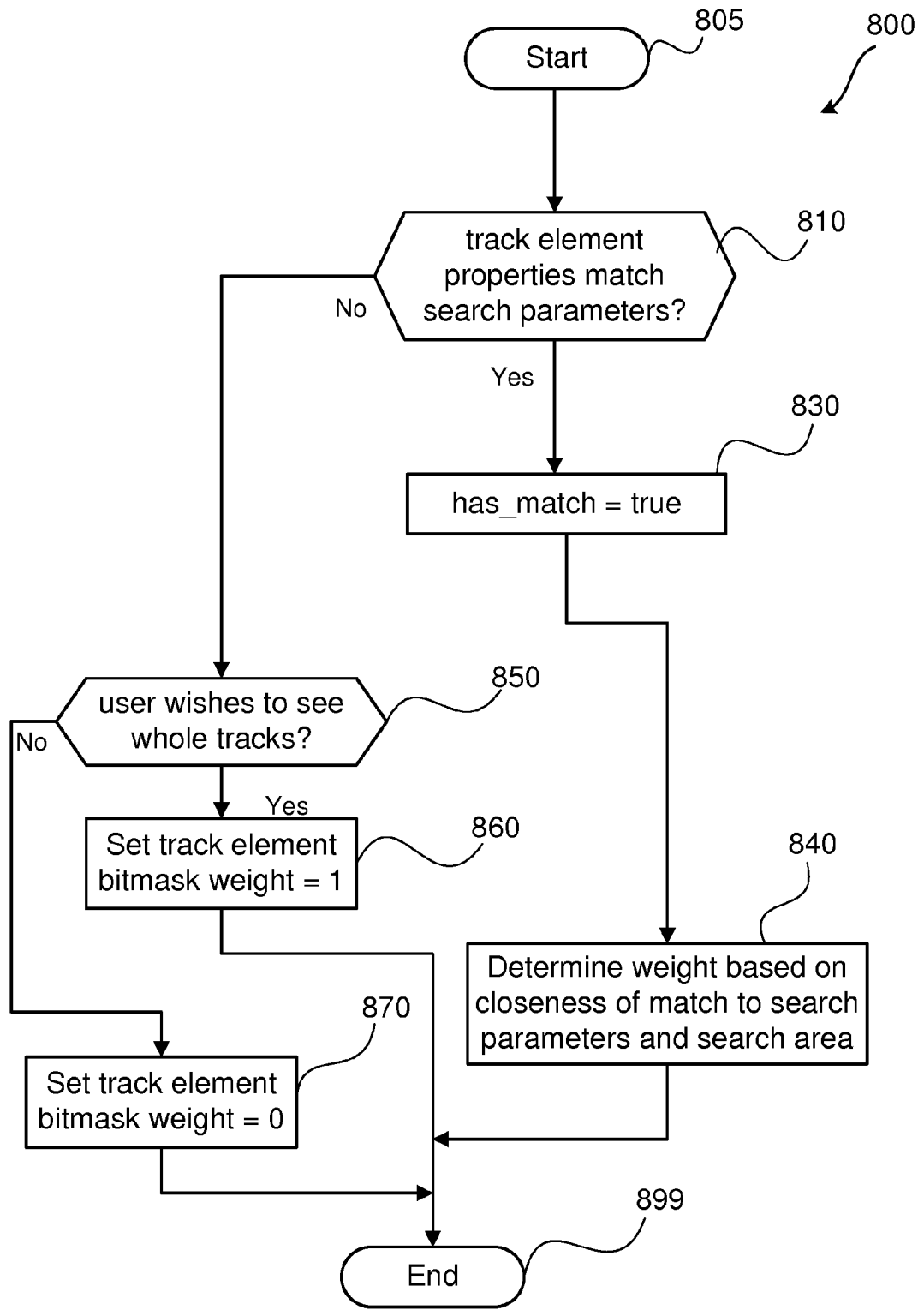
FIG. 8 shows a flow diagram of a method of handling a track element based on the search criteria in the video scene summary subsystem resident on a computer module.

FIG. 8 is a flow diagram 800 illustrating functionality of a video scene summary subsystem, which may implemented as a computer 120 or computer module 200, corresponding to step 730 of FIG. 7, to determine track element bitmask weight and has_match flag using track element search criteria. The process 800 begins at a Start step 805 and proceeds to step 810, which checks whether the characteristics of the track element match the requested search criteria specified by the user. Possible track element characteristics (properties) are described later. If at step 810 the characteristics (properties) match the search criteria or selection criteria, Yes, the process continues to step 830, which sets the track element has_match flag to true. Control passes from step 830 to step 840, which determines the track element bitmask weight based on the closeness of the match to the search parameters in step 810 and how closely the track element bitmask overlap of the search area matches the requirements of the user in step 810. Possible algorithms for determining the track element weight are described later. Finally, the process 800 concludes at an End step 899.

Returning to step 810, if the characteristics (properties) of the track element do not match the user-specified search (selection) criteria, the process 800 proceeds from step 810 to decision step 850. Decision step 850 checks whether the user wishes to see whole tracks or only the sections of tracks that match the search criteria. If the user wishes to see whole tracks, Yes, the process continues to step 860, which sets the track element bitmask weight to 1, and the process concludes at the End step 899. Otherwise, if at step 850 the user does not want to see whole tracks, control passes to step 870, which sets the track element bitmask weight to 0. Control passes from step 870 to the End step 899 and the process 800 concludes.

The track element can include, but is not limited to, such characteristics (properties) as speed, direction, size, aspect ratio, height, width, identity characteristics, behaviour characteristics, merge/split characteristics, and appearance consistency. Speed, direction, height, width, and size can be either in screen co-ordinates (e.g., the x-component of the speed is 2 pixels leftwards per frame) or in real co-ordinates (e.g., the car is travelling at 30 km/hr). Real co-ordinate values typically rely on scene perspective knowledge to convert from screen co-ordinates.

Identity characteristics can include, for example: dominant colour and colour profile; dominant texture and texture profile; mean temperature; high and low temperature, and temperature profile; whether the track element has a human body, or a face, or whether the face matches a known face in a database; or whether the track element is similar in appearance to a known object in a database; or what the person is carrying or wearing; or the number of bags carried by the person; or whether the person is carrying food or drinks; or whether the person is carrying a book or a phone or a laptop computer; or whether the person is in a wheelchair or has a walking stick or umbrella, or walking frame or has a guide dog or cane; or whether the person is wearing a hat or a helmet; or the probability the person has a weapon and, if they are a classification of the type of weapon; or whether the track element resembles a car or other vehicle; or the presence and placement of people in the car or other vehicle, or whether the vehicle has running lights, headlights, fog lights, or indicator lights on or has broken lights or a broken windscreen, or whether the vehicle is emitting excessive exhaust fumes, or whether the vehicle has a flat tyre, or whether the vehicle is making excessive noise, or what model of car the track element resembles, or the numberplate of the car, or the detected weight of the track element; or any combination thereof. It will be appreciated that the identity characteristics depend on the particular implementation and other identity characteristics may equally be utilised without departing from the spirit and scope of the present disclosure.

Behaviour characteristics can include, for example: the expression on a face; or which direction a person is looking; or which direction the head or body is oriented; or the direction a person is reaching, gesturing, or pointing; or how much a person is gesturing; or whether a person is currently standing, walking, running, falling, loitering, moving in a drunken or erratic fashion; whether an object is making a noise and at what volume; whether the object is a person that is speaking and/or how loudly the person is speaking; what language the person is speaking; what the person is saying; whether the person is interacting with other people or objects, such as abandoning an object or removing an object or opening or closing a door or window; whether the person is talking on a phone or reading a book or interacting with a laptop computer; or whether a person is smoking; or whether a person is eating or drinking; or whether a person is using an umbrella; whether a person is concealing their face; what expression is on a face of a person; or whether the person has an aggressive stance, such as making sudden gestures, or moving towards someone while the other person backs away; or whether a driver is looking away from the road or talking on a mobile phone or eating or drinking or does not have their hands on the steering wheel; or whether a driver or passenger does not have a seatbelt on; or whether a vehicle is moving erratically; or whether a vehicle is driving aggressively, such as being too close to the vehicle ahead, flashing its headlights or high beams, switching lanes rapidly and without indicating; or any combination thereof. It will be appreciated that the behaviour characteristics depend on the particular implementation and other behaviour characteristics may equally be utilised without departing from the spirit and scope of the present disclosure.

Behaviour characteristics and identity characteristics may also be combined with environmental data including, but not limited to, light levels, weather conditions, temperature, time of day, known traffic conditions, and known public events such as parades or public holidays. For example, an identity characteristic such as "car has high beam headlights on" has a different meaning when it is dark, when it is foggy, when there is a car directly in front, or when it is daytime.

Merge/split characteristics can include, for example, the time since the track last merged or split with another track, or how many times the track has merged and/or split, or any combination thereof.

Appearance consistency can include, for example, averages of how similar individual pixels of the track element are to previous track elements in the track, and the average portion of the time that each individual pixel of the track element has had the current appearance, or a combination thereof.

Track element characteristics may be derived from the appearance of the track element captured by a camera sensor in a single frame or over a period of time, or may derive information from a combination of sensors including, but not limited to, video cameras, thermal or infrared sensors, door sensors, metal detectors, X-ray scanners, alarm sensors, radio frequency identifier (RFID) tag readers, omnidirectional microphones, directional microphones, Global Positioning System (GPS) receivers, and manual input from one or more persons. Some track element characteristics (properties), such as speed 440, size 450, track age 460, and aspect ratio 470, are illustrated in FIG. 4.

It is possible to use different algorithms to determine the track element bitmask weight in the determining step 840 of FIG. 8, depending on the particular application and what the user wishes to see in the track summary. If the user wishes to see a constant strength for the track, as in scene summary 350, as long as the track element has_match flag set to true in accordance with step 760 of FIG. 7, the user specifies "yes" for the selecting step 850 of FIG. 8 and a constant value 1 for the determining step 840. If the user wishes to see only those parts of the track that met the search (selection) criteria of matching steps 810 and 830, as in step 360 of FIG. 3, then the user specifies "no" for step 850 and a constant value 1 for step 840. If the user wishes to see the full track with the parts of the track that met the search (selection) criteria emphasised, as in step 370 of FIG. 3, the user specifies "yes" for step 850 and a constant value greater than 1 for step 840. If the user wishes to see a full track in which parts are emphasised according to how well is they match the search (selection) criteria, as in step 380 of FIG. 3, the user specifies "yes" for step 850, and a value greater than one corresponding to a distance measure of the track element characteristics (properties) from the user-specified search (selection) criteria of matching steps 810 and 830.

Many such distance measures may be utilised. A simple measure requires the user to specify a mean value and standard deviation for each parameter they wish to match:

$$W=1+E*sqrt(W(p1)^2+W(p2)^2+\ldots+W(pN)^2) \quad \text{Eqn (1)}$$

where W is the track element bitmask weight, E is the overall level of emphasis that the user wishes to put on the parameters they have selected, and W(f) is the weight of an individual parameter. The equation for W(f) is:

$$W(f)=1/(abs(P(f)-Q(f))/S(f)+1) \quad \text{Eqn (2)}$$

where P(f) is the value of the parameter for the track element, Q(f) is the expected value of the parameter for the track element, and S(f) is the standard deviation of the expected value of the parameter for the track element.

For example, if the user wants to emphasise (with E=2) track elements that had a speed of 10 km/hr with a standard deviation of 3 km/hr, and/or an aspect ratio of 0.5 with a standard deviation of 0.1, and receives a track element that has a speed of 9 km/hr and aspect ratio of 0.4, the values are:

$$W(\text{speed})=1/(abs(10-9)/3+1)=0.75 \quad \text{Eqn (3)}$$

$$W(\text{aspect ratio})=1/(abs(0.5-0.4)/0.1+1)=0.5 \quad \text{Eqn (4)}$$

$$W=1+2*sqrt(0.75^2+0.5^2)=2.803 \quad \text{Eqn (5)}$$

In another alternative embodiment for determining track element bitmask weight, the weight of an individual parameter, instead of being measured as a standard deviation from a mean, is calculated as a function of how much it is greater than or less than a value. This method may be more useful when a user wants to emphasise "large objects" or "fast objects" more.

Figure 9:
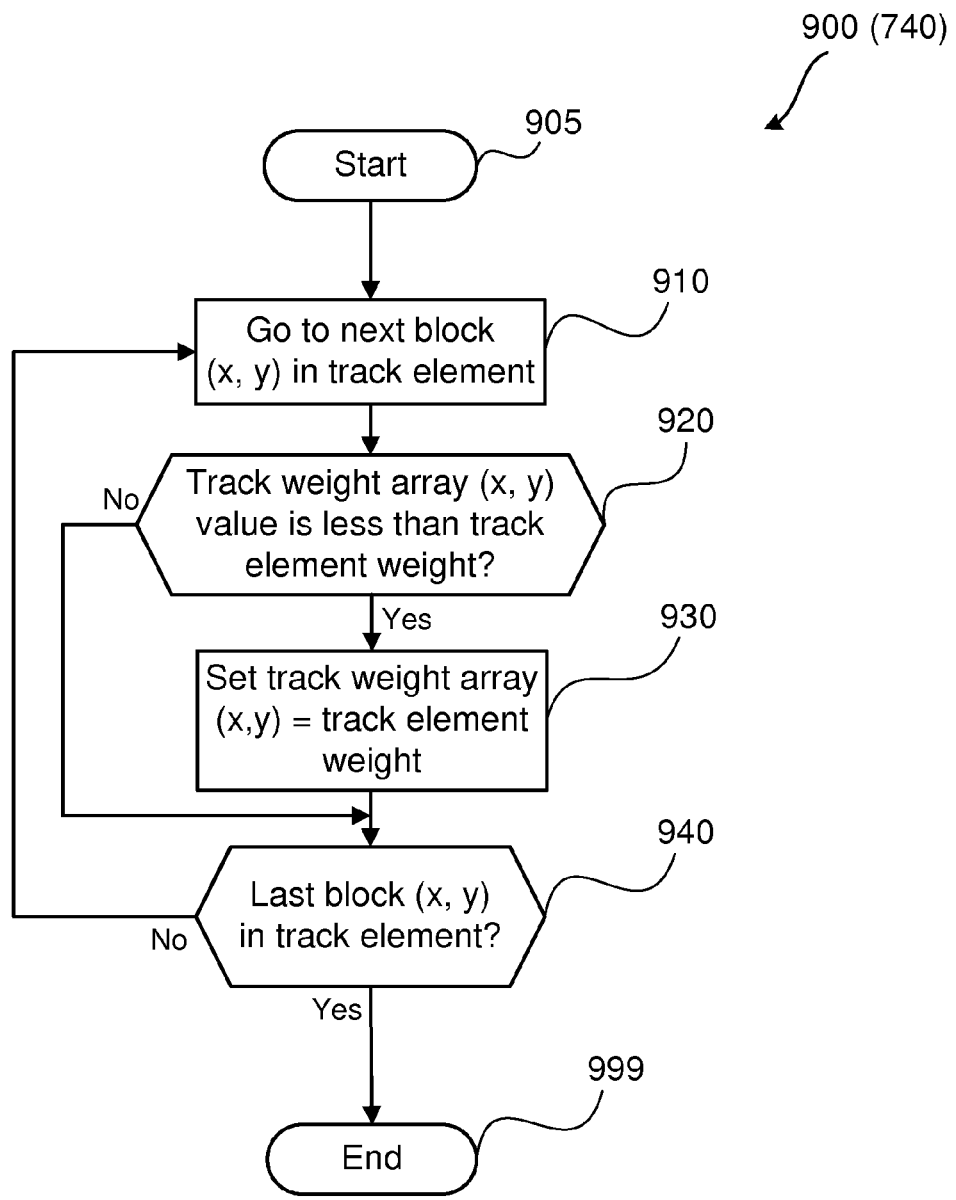
FIG. 9 shows a flow diagram of adding the track element to a track weight and track touch array in the video scene summary subsystem resident on a computer module.

FIG. 9 is a flow diagram 900 illustrating functionality of a video scene summary subsystem, which may be implemented as a computer 120 or computer module 200, elaborating on the adding step 740 of FIG. 7, which adds a track element to the track weight array using the track element bitmask weight calculated in the previous determining step 730, and adds the track element to the track touch array. The process 900 begins at a Start step 905 and proceeds to step 910, which processes each block with co-ordinates (x,y) in the track element in turn, starting with the first. Thus, step 910 selects the next block (x,y) in the track element and passes control to step 920.

Step 920 checks whether the corresponding track weight array element at (x,y) has a value less than the track element bitmask weight. If the corresponding track weight array element at (x,y) has a value less than the track element bitmask weight, Yes, the process 900 proceeds to step 930, which sets the track weight array element at (x,y) to be equal to the track element bitmask weight, and then proceeds to step 940. If at step 920 the corresponding track weight array element at (x,y) does not have a value less than the track element bitmask weight, No, the process skips step 930 and passes directly from step 920 to step 940. In step 940, the process checks whether all of the blocks in the track element have been processed. If step 940 determines that the current block is not the last block in the track element, No, then control returns to step 910 to process the next block. However, if step 940 determines that the current block is the last block in the track element, Yes, then control passes from step 940 to an End step 999 and the process 900 terminates.

Figure 10:
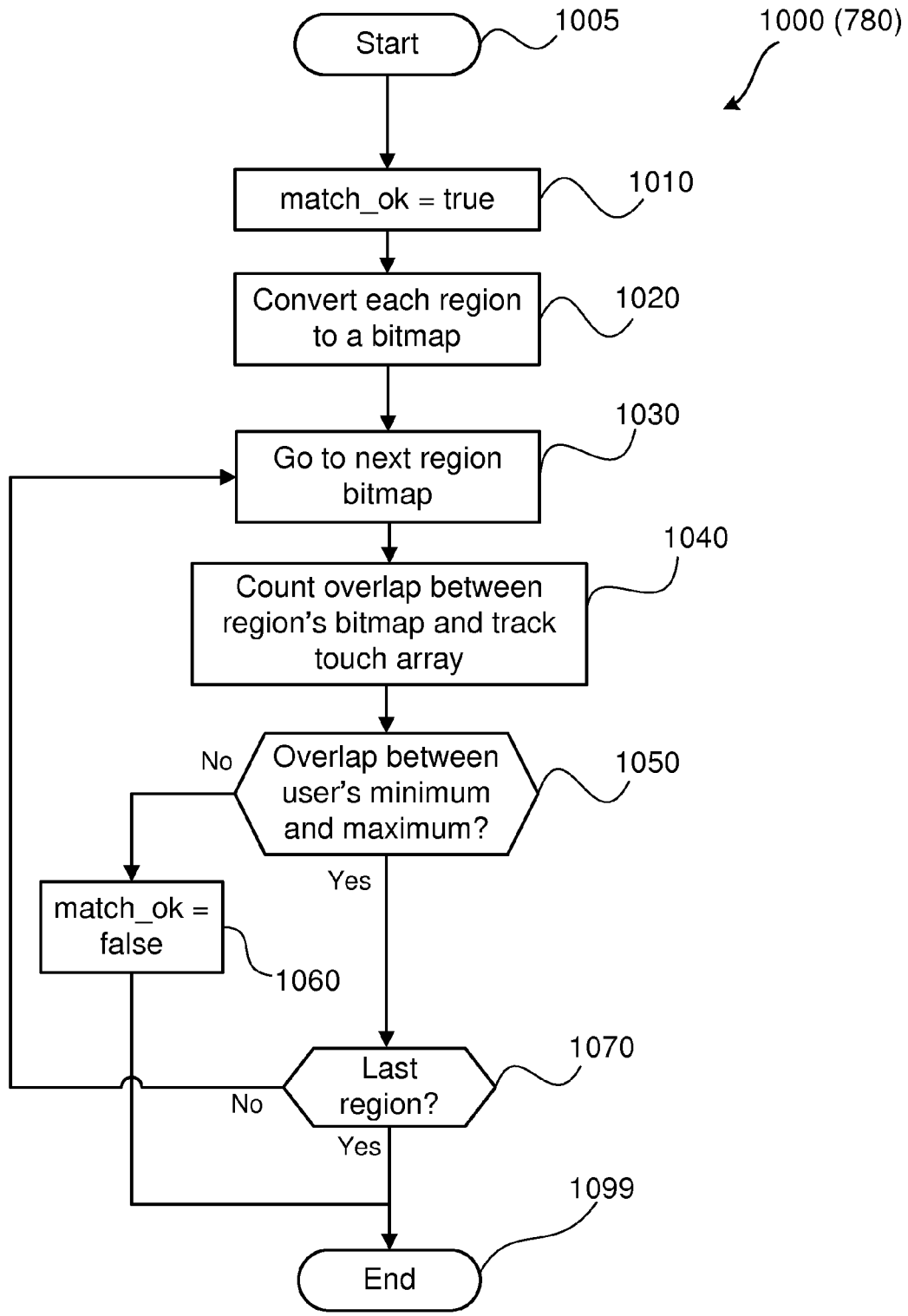
FIG. 10 shows a flow diagram of a method of checking if the track touch array touches all regions in the video scene summary subsystem resident on a computer module.

FIG. 10 is a flow diagram 1000 illustrating the functionality of a video scene summary subsystem, which may be implemented as a computer 120 or computer module 200, elaborating on the decision step 780 of FIG. 7, which tests whether the track touch array touches all designated regions. The process 1000 begins at a Start step 1005 and proceeds to step 1010, which sets the match_ok flag to true, and continues to step 1020, which converts each user-defined region into a bitmap, using a suitable technique for rendering polygon definitions to bitmaps. In an alternative embodiment, the bitmap for each region is stored and retrieved from a database 109 to avoid unnecessary recalculation. The process continues at step 1030 by going to the next region bitmap, which in the first iteration of the process 1000 is the first region bitmap. Control passes to step 1040, which is counts the number of pixels that overlap between the region bitmap and the track touch array.

In one embodiment, the process iterates through all the (x,y) coordinates of the region bitmap and counts the number of times the region bitmap and track touch array at the same coordinate (x,y) are set. In an alternative embodiment, the process counts the overlaps by iterating through comparing the region bitmap with each track element bitmask instead of using the track touch array.

The process continues from step 1040 to decision step 1050, which checks whether the overlap calculated in the previous step 1040 is between the predefined minimum and maximum values set by the user for that region. For example, in the example user interface 400 the user has implicitly set a minimum of one pixel overlap for each region. In an alternative embodiment, the user may use user interface components such as sliders 481, 482 to define a minima and/or maxima for each region, either as a proportion of the size of the region (e.g., "the track touched more than 50% of the first region and less than 10% of the second region"), a proportion of the size of the track (e.g., "more than 50% of the track was inside the first region"), or an absolute pixel count (e.g., "the overlap between the first region and the track was at least 10 pixels") according to the resolution defined by the object detection subsystem 103.

If the overlap is determined at step 1050 to be within the minimum and maximum thresholds, Yes, the process proceeds to step 1070 to check whether the last region has been processed. If the last region has been processed, Yes, control passes to an End step 1099 and the process 1000 concludes. Otherwise, if at step 1070 the last region has not been processed, No, the process 1000 returns to step 1030 to process the next region bitmap.

Returning to step 1050, if the overlap was not between the minimum and maximum, No, control passes to step 1060, which sets the match_ok flag to be false. Control passes from step 1060 to the End step 1099 and the process 1000 concludes.

Figure 11:
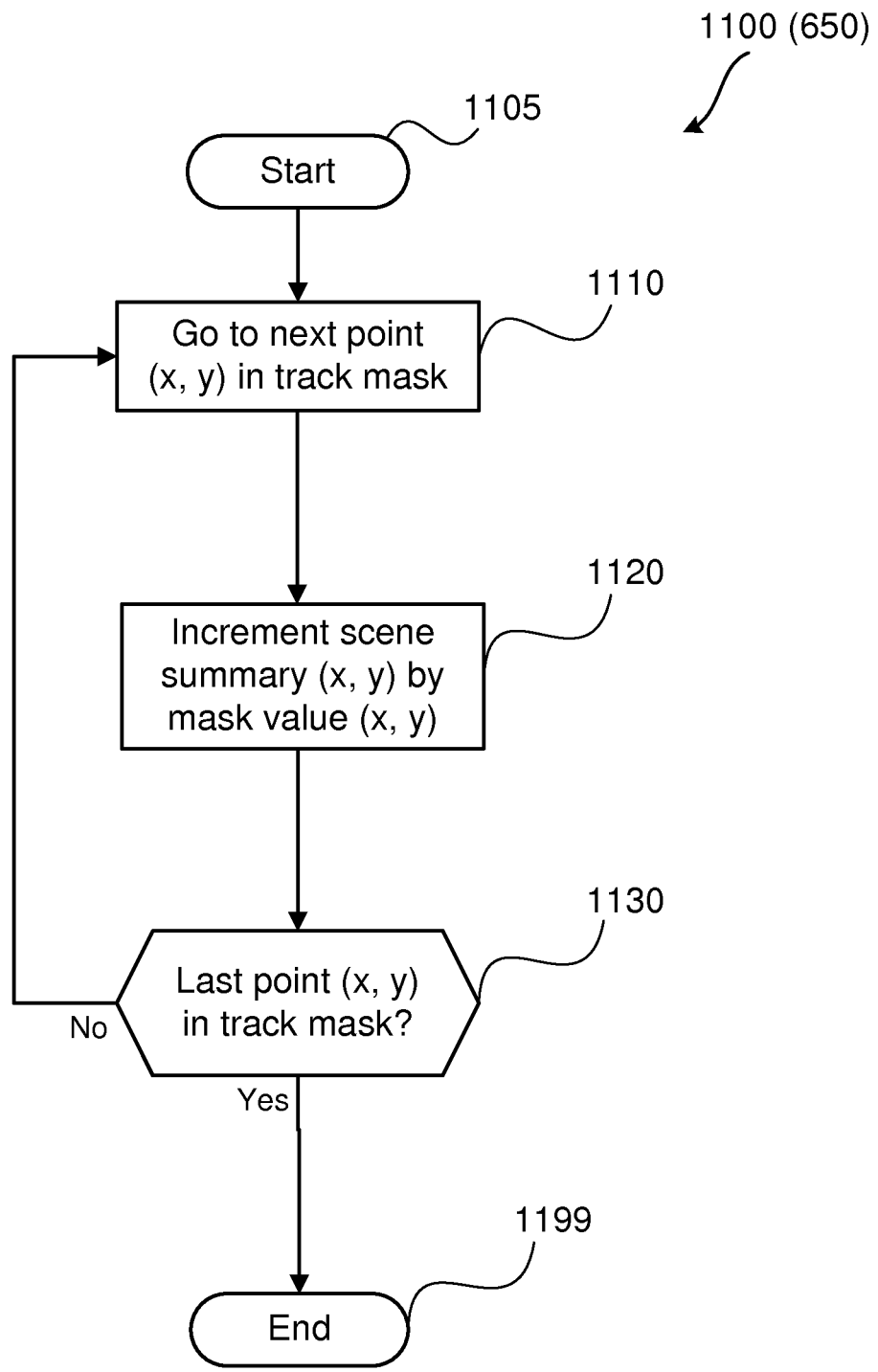
FIG. 11 shows a flow diagram of adding the track summary to a scene summary in the video scene summary subsystem resident on a computer module.

FIG. 11 is a flow diagram 1100 illustrating functionality of a video scene summary subsystem, which may be implemented as a computer 120 or computer module 200, detailing the adding step 650 of FIG. 6, which adds a track summary to the scene summary. The process 1100 begins at a Start step 1105 and proceeds to step 1110, which moves to the next point (x,y) in the track mask. In the first iteration of the process 1100, step 1110 moves to the first point in the track mask. The process passes to step 1120, which increments and therefore modifies the scene summary bitmask at the co-ordinate (x,y) by the mask value at the co-ordinate (x,y) corresponding to the point presently being processed. Control then passes to step 1130, which determines whether all the points in the track mask have been processed. If the current point is not the last point in the track mask, No, control returns from step 1130 to step 1110. However, if the current point is the last point in the track mask, Yes, control passes from step 1130 to an End step 1199 and the process terminates.

Figure 12:
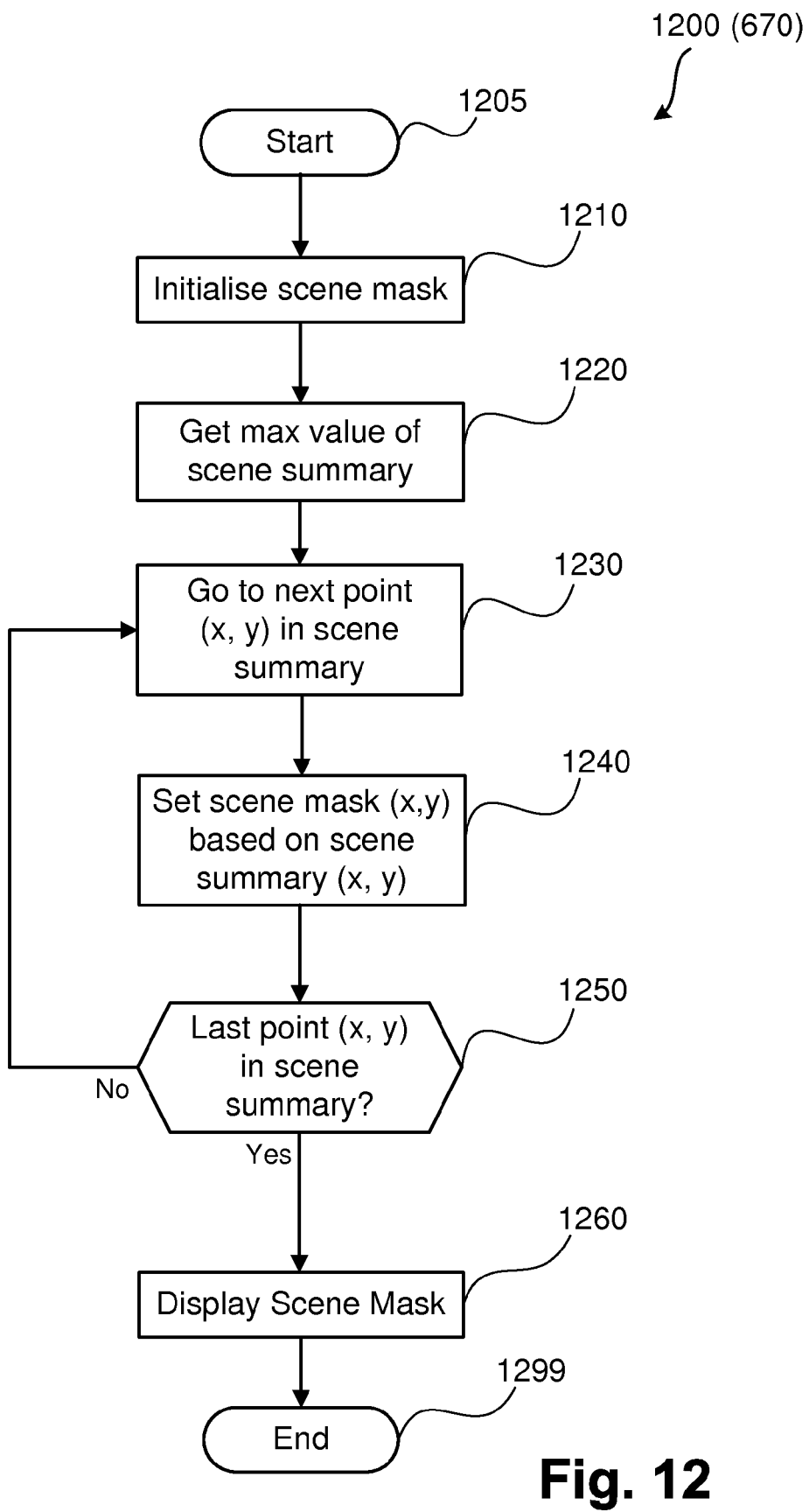
FIG. 12 shows a flow diagram of creating and displaying the scene mask.

FIG. 12 is a flow diagram 1200 illustrating the functionality of a video scene summary subsystem, which may be implemented as a computer 120 or computer module 200, elaborating on the creating and displaying step 670 of FIG. 6 to create and display a scene mask. The process 1200 begins at a Start step 1205 and proceeds to step 1210, which initialises the scene mask by setting each integer (x,y) co-ordinate of the scene mask to 0. The process then continues to step 1220, which determines the maximum value of all the points in the scene summary. Control then passes from step 1220 to step 1230, which moves to the next point (x,y) in scene summary array. In the first iteration of the process 1200, step 1230 moves to the first point. Control then proceeds to step 1240, which sets the scene mask value based on the scene summary value at the point (x,y) that is presently being processed. This calculation is done to ensure all the relevant detail of the scene is retained and not lost. In one embodiment, the value is:

$$ceil(100*summary\_value(x,y)/max(max\_summary\_value,1)), \quad \text{Eqn (6)}$$

that is, scaled to a value between 0 and 100, with a value of 0 only if the summary value is 0. In an alternative embodiment, the calculation instead uses a function or lookup table that compresses the upper range of values (for example, log (x) or sqrt(x)).

The process 1200 continues from step 1240 to step 1250, which checks whether all the points in the scene summary have been processed. If the presently processed point is not the last point in the scene summary, No, the process proceeds to the next point in the scene summary by returning to step 1230. However, if at step 1250 it is determined that the presently processed point is the last point in the scene summary, Yes, control passes from step 1250 to step 1260, which displays the scene mask.

Display of the scene mask may be done in a number of ways known in the art of image display. One implementation overlays a semi-opaque colour or false-colour map over a background picture, for which the opacity or colour at a position (x,y) in the picture varies according to the scene mask value at that co-ordinate (x,y). One particular implementation optionally scales the semi-opaque colour or false-colour map such that the maximum value of any scene summary array co-ordinate corresponds to the maximum opacity or colour. The background picture may be, for example, a simple single colour, or a single video frame being the first frame of the time period, or a single video frame being the frame closest to the centre of the time period, or an average of all the video frames in the time period, or the first video frame containing no objects, if there is one.

After displaying the scene mask in step 1260, control passes to an End step 1299 and the process terminates.

INDUSTRIAL APPLICABILITY

The arrangements described are applicable to the computer and data processing industries and particularly for the imaging, security, and retail industries.

The foregoing describes only some embodiments of the present invention, and modifications and/or changes can be made thereto without departing from the scope and spirit of the invention, the embodiments being illustrative and not restrictive.

We claim:

1. A computer-implemented method of displaying on a display device a track summary of an object in a scene of a video sequence, said method comprising the steps of:
   determining a plurality of track elements of the object detected in the scene of the video sequence, wherein each of the plurality of track elements indicates the detected object in a frame and a track of the object in a collection of track elements in a video sequence;
   receiving a selection criterion;
   identifying at least one characteristic of interest of the object, based on the selection criterion;
   selecting a track element from the plurality of track elements in the track, said selected track element satisfying the at least one identified characteristic of interest; and
   displaying the plurality of track elements in the track as the track summary, wherein the selected track element is displayed differently from other track elements of the plurality of track elements.

2. The method according to claim 1, wherein the track summary comprises a union of a plurality of bitmasks associated with the plurality of track elements.

3. The method according to claim 2, wherein the union of the plurality of bitmasks applies a logical AND operator to the plurality of bitmasks.

4. The method according to claim 1, wherein said track summary is derived from a weighted superimposition of a plurality of bitmasks associated with the plurality of track elements.

5. The method according to claim 4, wherein said plurality of bitmasks associated with the detected track elements are partially opaque.

6. The method according to claim 5, wherein the level of opacity associated with each bitmask of each track element is dependent upon said selection criteria and a determined parameter of said each track element.

7. The method according to claim 1, wherein the displayed plurality of track elements in the track summary are presented as a semi-opaque overlay of a plurality of bitmasks associated with the plurality of track elements.

8. The method according to claim 1, wherein the displayed plurality of track elements in the track summary are presented as a heat map.

9. The method according to claim 1, wherein the at least one characteristic of interest of the object includes the apparent size of the object from the perspective of the display device.

10. The method according to claim 1, wherein the selection criterion is a region in the scene of the video sequence designated by a user.

11. A non-transitory computer readable storage medium having recorded thereon a computer program for displaying on a display device a track summary of an object in a scene of a video sequence, said computer program comprising code for performing the steps of:
   determining a plurality of track elements of the object detected in the scene of the video sequence, wherein each of the plurality of track elements indicates the detected object in a frame and a track of the object in a collection of track elements in a video sequence;
   receiving a selection criterion;
   identifying at least one characteristic of interest of the object, based on the selection criterion;
   selecting a track element from the plurality of track elements in the track, said selected track element satisfying the at least one identified characteristic of interest; and
   displaying the plurality of track elements in the track as the track summary, wherein the selected track element is displayed differently from other track elements of the plurality of track elements.

12. An apparatus for displaying on a display device a track summary of an object in a scene of a video sequence, said apparatus comprising:
   a storage device for storing a computer program; and
   a processor for executing the program, said program comprising code for performing the method steps of:
      determining a plurality of track elements of the object detected in the scene of the video sequence, wherein each of the plurality of track elements indicates the detected object in a frame and a track of the object in a collection of track elements in a video sequence;
      receiving a selection criterion;
      identifying at least one characteristic of interest of the object, based on the selection criterion;
      selecting a track element from the plurality of track elements in the track, said selected track element satisfying the at least one identified characteristic of interest; and
      displaying on the display device the plurality of track elements in the track as the track summary, wherein the selected track element is displayed differently from other track elements of the plurality of track elements.

* * * * *